United States Patent
Hennig

(10) Patent No.: US 11,176,336 B2
(45) Date of Patent: Nov. 16, 2021

(54) RADIO TRANSPONDER AND METHOD FOR DATA TRANSMISSION BETWEEN A RADIO TRANSPONDER READER AND THE RADIO TRANSPONDER

(71) Applicant: Siemens Aktiengesellschaft, Munich (DE)

(72) Inventor: Bernd Hennig, Rosstal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/262,539

(22) PCT Filed: Jun. 17, 2019

(86) PCT No.: PCT/EP2019/065811
§ 371 (c)(1),
(2) Date: Jan. 22, 2021

(87) PCT Pub. No.: WO2020/020536
PCT Pub. Date: Jan. 30, 2020

(65) Prior Publication Data
US 2021/0248332 A1   Aug. 12, 2021

(30) Foreign Application Priority Data
Jul. 25, 2018 (EP) ..................... 18185432

(51) Int. Cl.
*G06K 7/10* (2006.01)
*G06K 19/07* (2006.01)

(52) U.S. Cl.
CPC ..... *G06K 7/10227* (2013.01); *G06K 19/0723* (2013.01)

(58) Field of Classification Search
CPC ................. G06K 7/10227; G06K 19/0723
(Continued)

(56) References Cited

U.S. PATENT DOCUMENTS 7,932,813 B2 * 4/2011 O'Byrne .............. G06K 7/0008
340/10.1
9,112,543 B2 * 8/2015 McFarthing ......... H04B 5/0031
(Continued)

FOREIGN PATENT DOCUMENTS

CN     101542998    9/2009
CN     103514421    1/2014
(Continued)

OTHER PUBLICATIONS

PCT International Search Report and Written Opinion of International Searching Authority dated Sep. 10, 2019 corresponding to PCT International Application No. PCT/EP2019/065811 filed Jun. 17, 2019.
(Continued)

*Primary Examiner* — Paultep Savusdiphol
(74) *Attorney, Agent, or Firm* — Cozen O'Connor

(57) ABSTRACT

A radio transponder and method for data transfer between a radio transponder reading device and the radio transponder, wherein a control unit of the radio transponder controls a change in a load impedance via a control signal having a selected switching pulse frequency and a selected switching pulse quantity to produce a response signal, where the control unit codes multiple-valued at least ternary symbols into the control signal, and where symbol values are assigned to respective switching pulse sequences each having a unique combination of switching pulse frequency, switching pulse number and phase shift such that only combinations for which the quotient of switching pulse number and switching pulse frequency lies within a predefined value range are selected.

17 Claims, 3 Drawing Sheets

(58) Field of Classification Search
USPC .................................................. 235/450, 492
See application file for complete search history.

(56) References Cited

U.S. PATENT DOCUMENTS

| | | | |
|---|---|---|---|
| 9,385,902 B2* | 7/2016 | Mo | ..................... H04L 27/2035 |
| 2006/0071782 A1* | 4/2006 | Ahmed | ................. G01S 13/825 |
| | | | 340/539.13 |
| 2009/0284352 A1 | 11/2009 | Witschnig et al. | |
| 2014/0001272 A1 | 1/2014 | Prestros | |
| 2015/0318979 A1* | 11/2015 | Ciacci | ................... H04L 7/0012 |
| | | | 375/358 |

FOREIGN PATENT DOCUMENTS

| | | |
|---|---|---|
| DE | 102015106256 | 10/2015 |
| EP | 2940916 | 11/2015 |

OTHER PUBLICATIONS

Office Action dated Aug. 27, 2021 issued in Chinese Patent Application No. 201980049323.0.

* cited by examiner

RADIO TRANSPONDER AND METHOD FOR DATA TRANSMISSION BETWEEN A RADIO TRANSPONDER READER AND THE RADIO TRANSPONDER

CROSS-REFERENCE TO RELATED APPLICATIONS

This is a U.S. national stage of application No. PCT/EP2019/065811 filed 17 Jun. 2019. Priority is claimed on European Application No. 18185432.4 filed 25 Jul. 2018, the content of which is incorporated herein by reference in its entirety.

BACKGROUND OF THE INVENTION

1. Field of the Invention

The present invention relates to a radio transponder and method for data transmission between a radio transponder reader and the radio transponder.

2. Description of the Related Art

Radio transponders may be, for example, RFID (radio-frequency identification) tags that are fitted to respective items in order to identify or locate them. RFID tags comprise a memory unit, the content of which can be read, but also altered, via an RFID reader. RFID tags usually each store at least one identifier. In order to read information stored in RFID tags, RFID readers each transmit a request signal by generating an electromagnetic alternating field. This electromagnetic alternating field is firstly used to supply power to, in particular passively operated, RFID tags that have no power source of their own. The electromagnetic alternating field is secondly modulated by RFID tags, such as via load modulation or by varying their antenna impedance, in order to transmit a response signal.

Radio transponder systems for industrial automation systems must meet particular requirements with respect to reliable data transmission, authenticity of transmitted data and insensitivity toward jamming transmitters. Industrial automation systems are used for monitoring, controlling and regulating technical processes, in particular in the field of production. As such, process and buildings automation, perturbed or manipulated radio transponder systems can have serious consequences, where interruption of an automation system can occur in the worst case.

U.S. Pat. No. 9,112,543B2 discloses a radio transponder system in which a signal for supplying power to a communication device is transmitted during one time period. During a second time period, a data signal is transmitted to the communication device based on phase shift keying, frequency shift keying or quadrature amplitude modulation. A larger Q factor is selected for an antenna system that is used during the first time period than during the second time period.

U.S. Pat. No. 7,932,813B2 describes an RFID system having an RFID reader that uses synchronized sampling to receive a modulation signal from an RFID tag, specifically irrespective of whether the RFID tag uses amplitude shift keying, frequency shift keying or phase shift keying for this purpose. A modulation signal generated by the RFID tag comprises one or more subharmonics of an electromagnetic field generated by the RFID reader, where the RFID reader performs synchronized sampling around the frequency of the electromagnetic field. This cushions a loading by the modulation signal on the electromagnetic field generated by the RFID reader.

In HF-RFID systems, a data transmission from a transponder to a reader/writer is usually effected by virtue of an RF carrier signal, which is simultaneously used for supplying power to the transponder, having its amplitude changed by connecting an additional load resistor. This is accomplished by using a control signal that has a selected control signal auxiliary carrier frequency and a selected number of control pulses or oscillations. Reducing the number of control pulses or increasing the control signal switching frequency allows a data rate increase in principle. However, this leads to a shorter range for the data transmission from transponders to readers/writers or to increased sensitivities toward interference. Specifically, under application conditions in industrial automation systems, a reduction in the number of control pulses is critical in regard to an associated loss of redundancy.

SUMMARY OF THE INVENTION

In view of the foregoing, it is an object of the present invention to provide a radio transponder and method for data transmission between a radio transponder reader and the radio transponder that allows an increased data rate from the radio transponder to the radio transponder reader without limitations in regard to range or reliability.

This and other objects and advantages are achieved in accordance by the invention by radio transponder and a method for data transmission between a radio transponder reader, in particular a radio transponder reader/writer, and the radio transponder, where the radio transponder reader modulates at least one control command onto a stipulated radio carrier signal and transmits the modulated radio carrier signal to the radio transponder. By way of example, the radio transponder reader can code the control command and subsequently modulate it onto the stipulated radio carrier signal. The radio transponder receives the modulated radio carrier signal via an inductive antenna arrangement to which a load modulation unit is connected that comprises a variable load impedance. A control unit of the radio transponder generates a response signal by controlling a change of the load impedance via a control signal that has a selected switching pulse frequency and a selected number of switching pulses.

In accordance with the invention, the control unit codes multi-value, at least ternary, symbols into the control signal. Symbol values are respectively assigned to switching pulse sequences that each have a unique combination of switching pulse frequency, number of switching pulses and phase shift. Only combinations whose quotient of number of switching pulses and switching pulse frequency is within a stipulated range of values are selected. The symbols coded into the control signal therefore comprise an increased information content, which results in an increased data rate. In particular, this is possible without increasing the switching pulse frequency and without reducing the number of switching pulses. The increased data rate thus has no adverse effects on range or interference immunity or redundancy. The symbols are preferably coded using at least a first and a second switching pulse frequency, a first and a second number of switching pulses and a first and a second phase shift.

In accordance with an advantageous embodiment of the present invention, the symbols are coded using at least a first and a second switching pulse frequency and a first and a second number of switching pulses. A quotient of first number of switching pulses and first switching pulse frequency and a quotient of second number of switching pulses and second switching pulse frequency differ from one another by no more than 10%. The data rate therefore remains relatively constant regardless of the respectively coded symbol value.

In addition to the aforementioned symbol values that are respectively assigned to switching pulse sequences having a unique combination of switching pulse frequency, number of switching pulses and phase shift, precisely one symbol value is preferably used that has an assigned tiny switching pulse sequence. This tiny switching pulse sequence deactivates a load modulation for a stipulated period. This stipulated period is advantageously within the stipulated range of values of the quotient of number of switching pulses and switching pulse frequency. In particular, the control unit can use the switching pulse sequences assigned to the symbol values to control a load modulation using combined frequency shift keying, phase shift keying and modulation deactivation.

In accordance with a preferred embodiment of the present invention, the control signal has essentially square-wave pulses or temporarily no signal strength. In particular, the square-wave pulses preferably each have a pulse duration that corresponds to half of one period duration. This allows simple and reliable demodulation at the reader.

The control unit advantageously assigns the symbol values to switching pulse sequences in accordance with a code table stored in a memory unit of the radio transponder. The radio transponder reader also stores a corresponding code table. Furthermore, selected symbol values can represent control commands for data flow control between the radio transponder reader and radio transponder, for collision detection during simultaneous transmission attempts by multiple radio transponders and/or for identification of a start or end of a data frame. This allows a further improvement in reliability and efficiency for the data transmission.

The radio transponder in accordance with the invention is intended to perform the method in accordance with the above-disclosed embodiments and comprises an inductive antenna arrangement configured to receive a modulated radio carrier signal, transmitted by a radio transponder reader, which comprises at least one control command modulated onto a radio carrier signal. Additionally, the radio transponder has a load modulation unit, connected to the antenna arrangement, which comprises a variable load impedance. Furthermore, control unit is provided which is configured to generate a response signal by controlling a change of the load impedance via a control signal that has a selected switching pulse frequency and a selected number of switching pulses. In addition, the control unit is configured to code multi-value, at least ternary, symbols into the control signal.

In accordance with the invention, the radio transponder is configured to respectively assign symbol values to switching pulse sequences that each have a unique combination of switching pulse frequency, number of switching pulses and phase shift. Only combinations whose quotient of number of switching pulses and switching pulse frequency is within a stipulated range of values are selectable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is outlined in more detail below using an exemplary embodiment with reference to the drawing, in which.

DETAILED DESCRIPTION OF THE EXEMPLARY EMBODIMENTS

Figure 1:
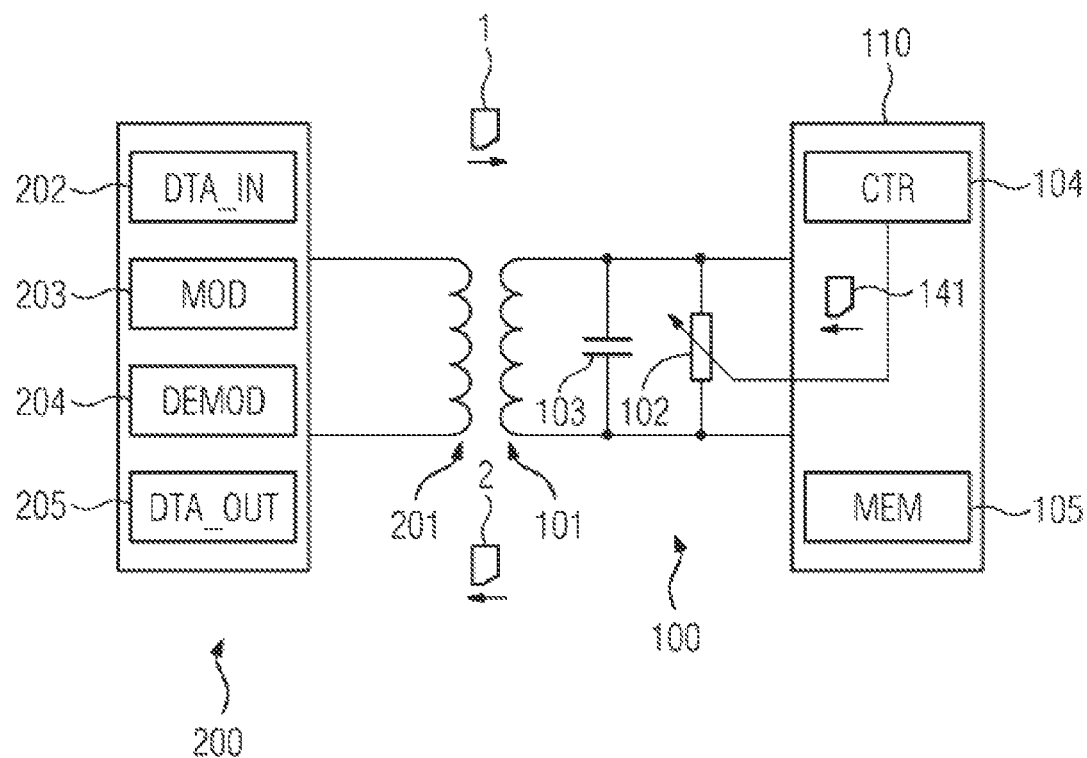
FIG. 1 shows a schematic depiction of a radio transponder system having a radio transponder and a radio transponder reader connected thereto in accordance with the invention.

The radio transponder system schematically depicted in FIG. 1 comprises a radio transponder reader/writer 200 and a radio transponder 100 inductively couplable thereto. Accordingly, the radio transponder 100 and the radio transponder reader/writer 200 each have an inductive antenna arrangement 101, 201. The antenna arrangements 101, 201 are therefore depicted as inductances coupled to one another in FIG. 1. The radio transponder reader/writer 200 in the present exemplary embodiment additionally comprises a data input 202 for receiving control commands to be transmitted to the radio transponder 100, a modulation unit 203, a demodulation unit 204 and a data output 205 for providing information read from the radio transponder 100. In the present exemplary embodiment, the radio transponder 100 is an RFID tag. Accordingly, the radio transponder reader/writer 200 is an RFID reader/writer.

The radio transponder 100 comprises a load modulation unit formed by a load impedance 102 and by a control unit 104 for the load impedance 102. Additionally, the radio transponder 100 has a memory unit 105 that can be read or written to via the radio transponder reader/writer 200. The memory unit 105 stores at least one identifier assigned to the radio transponder 100, which identifier is not usually changed. The control unit 105 and the memory unit 105 in the present exemplary embodiment are integrated in a circuit 110 that comprises both units.

The radio transponder 100 additionally comprises a capacitor arrangement 103 arranged in parallel with the antenna arrangement 101 and the load impedance 102. The capacitor arrangement 103 is preferably variable with respect to its capacitance and in particular forms a tunable resonant circuit with the antenna arrangement 101. To adjust its capacitance, the capacitor arrangement 103 can have, for example, a plurality of capacitors arranged in parallel with one another that are each arranged in series with a fuse and can be disconnected via the respective fuse to tune the resonant circuit. In the present exemplary embodiment, the radio transponder 100 is operated passively, i.e., the transponder 100 has no power supply of its own, but rather is supplied with power via an electromagnetic alternating field generated by the radio transponder reader/writer 200.

For the purpose of data transmission between the radio transponder reader/writer 200 and the radio transponder 100, the radio transponder reader/writer 200 uses its antenna arrangement 100 to generate an electromagnetic alternating field that comprises at least one carrier frequency selected on the radio transponder reader/writer 200. In particular, the radio transponder reader/writer 200 modulates at least one coded control command onto a radio carrier signal at the selected carrier frequency and transmits the modulated radio carrier signal 1 to the radio transponder 100.

The radio transponder 100 receives the modulated radio carrier signal 1 via its inductive antenna arrangement 101 and uses its control unit 104 to decode the control command transmitted by the radio transponder reader/writer 200. To generate a response signal 2, the control unit 104 of the radio transponder 100 controls a change of the load impedance 102 via a control signal 141. In this manner, the radio transponder 100 codes and modulates its response into the electromagnetic alternating field generated by the radio transponder reader/writer 200, specifically by changing the field via load modulation.

The variable load impedance may, in the simplest case, be provided by a switchable load resistor, for example. Here, the control unit 104 of the radio transponder 100 generates the response signal 2 by controlling connection of the load resistor via the control signal 141. When the load resistor is connected, the radio transponder 100 consumes an energy component of the electromagnetic alternating field generated by the radio transponder reader/writer 200. This is detected by the radio transponder reader/writer 200 via its demodulation unit 204. In this manner, the radio transponder reader/writer 200 can provide information read from the memory unit 105 of the radio transponder 100, for example, at its data output 204.

Figure 2:
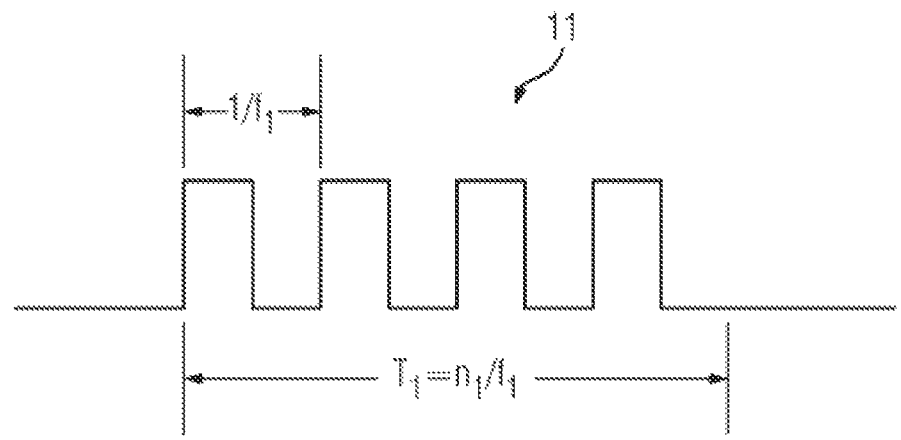
FIG. 2 shows a first switching pulse sequence for load modulation for the radio transponder shown in FIG. 1 in accordance with the invention.

FIG. 2 depicts a first switching pulse sequence 11 for the control signal 141 by way of illustration, where the control signal has a selected switching pulse frequency $f_1$ and a selected number of switching pulses $n_1$ (in this case: 4). This results in a symbol duration $T_1 = n_1/f_1$ for the first switching pulse sequence that is the reciprocal of a possible data rate. An actual data rate is normally lower than this possible data rate if additional coding rules, for example, Manchester coding or pulse position coding, are also taken into consideration. These additional coding rules firstly provide opportunities for detecting transmission errors. The additional coding rules can secondly allow further functionalities, such as collision detection or insertion of additional redundancy for increased data transmission security.

Figure 3:
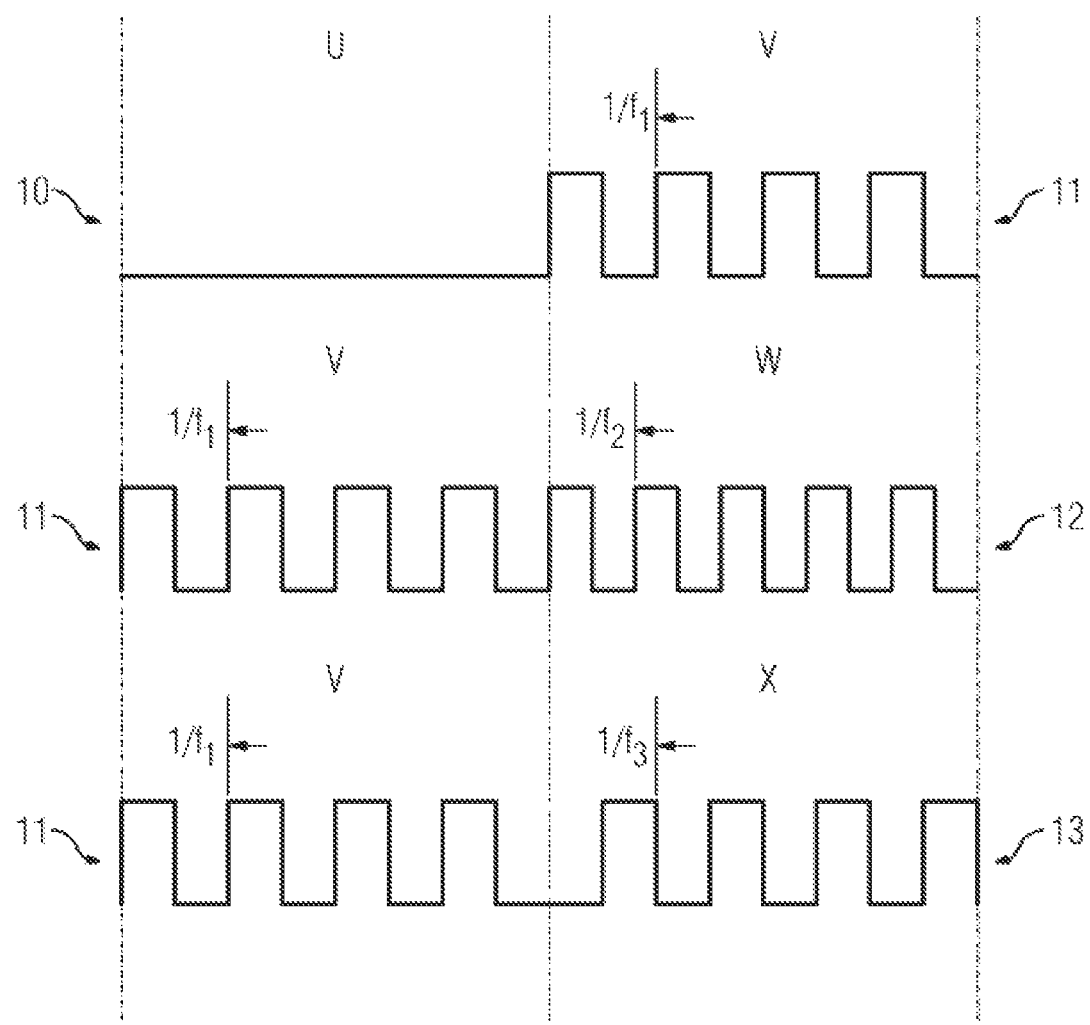
FIG. 3 shows further switching pulse sequences and associated symbol values in accordance with the invention.

Based on the first switching pulse sequence 11 shown in FIG. 2 and further switching pulse sequences 10, 12, 13 depicted in FIG. 3, the control unit 104 codes symbols that each represent one of multiple values into the control signal 141. In any event, the coded symbols are at least ternary, i.e., the coded symbols have 3 values. In the present exemplary embodiment, quaternary symbols are used, which can assume U, V, W or X as symbol values and therefore have an information content of 2 bits. The control unit 104 assigns the symbol values U-X to the switching pulse sequences 10, 11, 12, 13 in accordance with a code table stored in the memory unit 105 of the radio transponder 100. A corresponding code table is also stored in the radio transponder reader/writer 200. The first switching pulse sequence 11 has the symbol value V assigned to it in the code table, for example, while a second switching pulse sequence 12 is assigned the symbol value W, a third switching pulse sequence 13 is assigned the symbol value X and a fourth switching pulse sequence 10 is assigned the symbol value U.

In the present exemplary embodiment, the first to third switching pulse sequences 11, 12, 13 each have a unique combination of switching pulse frequency $f_1$, $f_2$, $f_3=f_1$, number of switching pulses $n_1=4$, $n_2=5$, $n_3=4$ and phase shift $\varphi_1=0°$, $\varphi_2=0°$, $\varphi_3=180°$. Only combinations whose quotient of number of switching pulses $n_i$ and switching pulse frequency $f_i$ is within a stipulated range of values $D_{min}$–$D_{max}$ are admissible. The symbols are preferably coded using at least a first ($f_1=f_3$) and a second ($f_2$) switching pulse frequency and also a first ($n_1=n_3$) and a second ($n_2$) number of switching pulses, the quotients $n_1/f_1=n_3/f_3$, $n_2/f_2$ of which differ from one another by no more than 10%. In this manner, the possible data rate remains sufficiently constant in each case.

The fourth switching pulse sequence 10 assigned to the symbol value U is a tiny switching pulse sequence that comprises no switching pulses. This tiny switching pulse sequence deactivates a load modulation for a stipulated period that is within the stipulated range of values $D_{min}$–$D_{max}$ of the quotient of number of switching pulses $n_i$ and switching pulse frequency $f_i$. The control signal 141 thus either comprises essentially square-wave pulses or temporarily has no signal strength. In the present exemplary embodiment, the square-wave pulses each have a pulse duration that corresponds to half of one period duration (duty factor 50%). All in all, the control unit uses the switching pulse sequences 10, 11, 12, 13 assigned to the symbol values U-X to control a load modulation using combined frequency shift keying, phase shift keying and modulation deactivation.

It is fundamentally possible for selected symbols to represent control commands for data flow control between the radio transponder reader/writer 200 and the radio transponder 100, for collision detection during simultaneous transmission attempts by multiple radio transponders and/or for identification of a start or end of a data frame.

Figure 4:
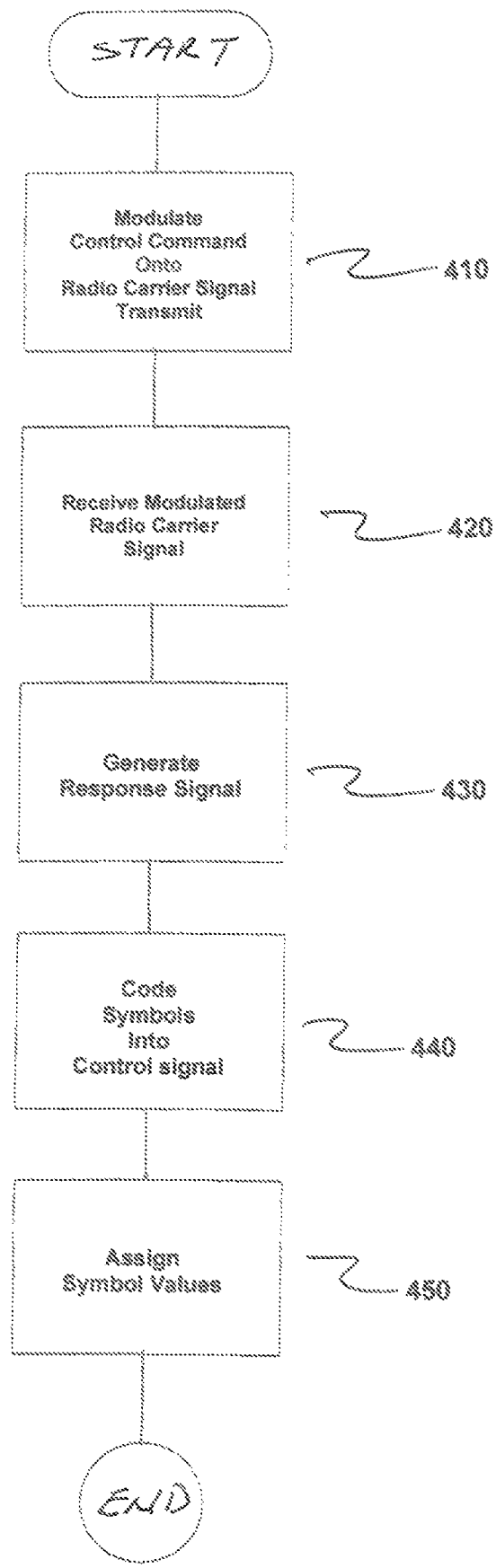
FIG. 4 is a flowchart of the method in accordance with the invention.

FIG. 4 is a flowchart of the method for data transmission between a radio transponder reader 100 and a radio transponder 200.

The method comprises modulating, by the radio transponder reader 200, at least one control command onto a radio carrier signal and transmitting the modulated radio carrier signal 1 to the radio transponder 100, as indicated in step 410.

Next, the radio transponder 100 receives the modulated radio carrier signal 1 via an inductive antenna arrangement 101, as indicated in step 420. In accordance with the invention, a load modulation unit comprising a variable load impedance 102 is connected to the inductive antenna arrangement 101.

Next, a control unit 104 of the radio transponder 100 generates a response signal 2 by controlling a change of the load impedance 102 via a control signal 141 having a selected switching pulse frequency and a selected number of switching pulses, as indicated in step 430.

Next, the control unit 104 codes multi-value, at least ternary, symbols into the control signal 141, as indicated in step 440.

Next, respective symbol values U-X are assigned to switching pulse sequences 10, 11, 12, 13 each having a unique combination of switching pulse frequency, number of switching pulses and phase shift, as indicated in step 450. In accordance with the invention, only combinations whose quotient of number of switching pulses and switching pulse frequency is within a stipulated range of values are thus selected.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data transmission between a radio transponder reader and a radio transponder, the method comprising:
   modulating, by the radio transponder reader, at least one control command onto a radio carrier signal and transmitting the modulated radio carrier signal to the radio transponder;
   receiving, by the radio transponder, the modulated radio carrier signal via an inductive antenna arrangement, a load modulation unit comprising a variable load impedance being connected to the inductive antenna arrangement;
   generating, by a control unit of the radio transponder, a response signal by controlling a change of the load impedance via a control signal having a selected switching pulse frequency and a selected number of switching pulses;
   coding, by the control unit, multi-value, at least ternary, symbols into the control signal; and
   assigning respective symbol values to switching pulse sequences each having a unique combination of switching pulse frequency, number of switching pulses and phase shift; wherein only combinations whose quotient of number of switching pulses and switching pulse frequency is within a stipulated range of values are selected.

2. The method as claimed in claim 1, wherein the symbols are coded utilizing at least a first and a second switching pulse frequency, a first and a second number of switching pulses and a first and a second phase shift.

3. The method as claimed in claim 2, wherein the symbols are coded utilizing at least a first and a second switching pulse frequency and a first and a second number of switching pulses; and wherein a quotient of first number of switching pulses and first switching pulse frequency and a quotient of second number of switching pulses and second switching pulse frequency differ from one another by no more than 10%.

4. The method as claimed in claim 2, wherein precisely one symbol value is additionally utilized, said precisely one symbol value including an assigned tiny switching pulse sequence which deactivates a load modulation for a stipulated period.

5. The method as claimed in claim 4, wherein the stipulated period is within the stipulated range of values of the quotient of number of switching pulses and switching pulse frequency.

6. The method as claimed in claim 1, wherein the symbols are coded utilizing at least a first and a second switching pulse frequency and a first and a second number of switching pulses; and wherein a quotient of first number of switching pulses and first switching pulse frequency and a quotient of second number of switching pulses and second switching pulse frequency differ from one another by no more than 10%.

7. The method as claimed in claim 6, wherein precisely one symbol value is additionally utilized, said precisely one symbol value including an assigned tiny switching pulse sequence which deactivates a load modulation for a stipulated period.

8. The method as claimed in claim 7, wherein the stipulated period is within the stipulated range of values of the quotient of number of switching pulses and switching pulse frequency.

9. The method as claimed in claim 1, wherein precisely one symbol value is additionally utilized, said precisely one symbol value including an assigned tiny switching pulse sequence which deactivates a load modulation for a stipulated period.

10. The method as claimed in claim 9, wherein the stipulated period is within the stipulated range of values of the quotient of number of switching pulses and switching pulse frequency.

11. The method as claimed in claim 1, wherein the control signal comprises essentially square-wave pulses or temporarily has no signal strength.

12. The method as claimed in claim 11, wherein the square-wave pulses each have a pulse duration which corresponds to half of one period duration.

13. The method as claimed in claim 1, wherein the control unit assigns the symbol values to switching pulse sequences in accordance with a code table stored in a memory unit of the radio transponder; and wherein the radio transponder reader stores a corresponding code table.

14. The method as claimed in claim 1, wherein the control unit utilizes the switching pulse sequences assigned to the symbol values to control a load modulation via combined frequency shift keying, phase shift keying and modulation deactivation.

15. The method as claimed in claim 1, wherein selected symbol values represent control commands for data flow control between radio transponder reader and radio transponder, for at least one of (i) collision detection during simultaneous transmission attempts by multiple radio transponders and (ii) identification of a start or end of a data frame.

16. The method as claimed in claim 1, wherein the radio transponder reader codes the control command and subsequently modulates said control command onto the radio carrier signal.

17. A radio transponder, comprising:
   an inductive antenna arrangement configured to receive a modulated radio carrier signal transmitted by a radio transponder reader, said modulated radio carrier signal comprising at least one control command modulated onto the radio carrier signal;
   a load modulation unit connected to the antenna arrangement and comprising a variable load impedance;
   a control unit configured to:
      generate a response signal by controlling a change of the load impedance via a control signal which has a selected switching pulse frequency and a selected number of switching pulses, and code multi-value, at least ternary, symbols into the control signal;

wherein the radio transponder is configured to assign respective symbol values to switching pulse sequences each having a unique combination of switching pulse frequency, number of switching pulses and phase shift; and wherein only combinations whose quotient of number of switching pulses and switching pulse frequency is within a stipulated range of values are selectable.

* * * * *